United States Patent
Ko et al.

(10) Patent No.: US 7,880,571 B2
(45) Date of Patent: Feb. 1, 2011

(54) TWO-AXIS DRIVING ELECTROMAGNETIC MICRO-ACTUATOR

(75) Inventors: Young-chul Ko, Yongin-si (KR);
Jin-woo Cho, Seongnam-si (KR);
Woo-hyek Choi, Yongin-si (KR);
Hee-moon Jung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 11/862,233

(22) Filed: Sep. 27, 2007

(65) Prior Publication Data
US 2008/0238592 A1   Oct. 2, 2008

(30) Foreign Application Priority Data
Mar. 27, 2007   (KR) .................. 10-2007-0030035

(51) Int. Cl.
*H01H 51/22*   (2006.01)
*H04R 25/00*   (2006.01)
*G02B 26/08*   (2006.01)
*G02B 26/10*   (2006.01)
*G02B 26/12*   (2006.01)

(52) U.S. Cl. .................. 335/78; 381/191; 359/224.1
(58) Field of Classification Search .................. 335/78; 381/171, 191; 359/224.1
See application file for complete search history.

(56) References Cited

U.S. PATENT DOCUMENTS

| 5,912,608 | A  | * | 6/1999 | Asada .................. 335/222 |
| 6,188,504 | B1 | * | 2/2001 | Murakami et al. ....... 359/224.1 |
| 6,388,789 | B1 | * | 5/2002 | Bernstein .................. 359/198.1 |
| 6,760,145 | B1 | * | 7/2004 | Taylor et al. .................. 359/290 |
| 6,774,445 | B2 | * | 8/2004 | Mutoh et al. .................. 257/415 |
| 6,775,050 | B2 |   | 8/2004 | Yoon et al. |
| 6,775,388 | B1 | * | 8/2004 | Pompei .................. 381/191 |
| 6,784,771 | B1 | * | 8/2004 | Fan .................. 335/78 |
| 6,791,731 | B2 | * | 9/2004 | Ryu et al. .................. 359/224.1 |
| 6,924,915 | B2 | * | 8/2005 | Hirose et al. .................. 359/199.3 |
| 6,949,996 | B2 | * | 9/2005 | Matsumoto et al. ........... 335/78 |

(Continued)

FOREIGN PATENT DOCUMENTS

KR   10-2003-0050798 A   6/2003

(Continued)

*Primary Examiner*—Anh T Mai
*Assistant Examiner*—Alexander Talpalatskiy
(74) *Attorney, Agent, or Firm*—Sughrue Mion, PLLC (57) ABSTRACT

Provided is a two-axis driving electromagnetic actuator that includes a stage that is operative to be actuated about a first axis; an inner frame that that is disposed outside the stage and supports the stage by the first axis; an external frame that is disposed outside the inner frame and supports the inner frame by a second axis which is perpendicular to the first axis; a magnet that provides an electric field between the first axis and the second axis; a first driving coil that is formed on the inner frame and to which a first signal that actuates the stage in a direction of the second axis is applied; and a second driving coil that is formed on the inner frame and to which a second signal that actuates the stage and the inner frame in a direction of the first axis is applied, wherein the first driving coil and the second driving coil are electrically separated from each other.

13 Claims, 7 Drawing Sheets

U.S. PATENT DOCUMENTS

| | | | |
|---|---|---|---|
| 6,989,921 B2 * | 1/2006 | Bernstein et al. | 359/290 |
| 6,992,552 B2 * | 1/2006 | Reinicke | 335/78 |
| 7,095,549 B2 * | 8/2006 | Iwasaki et al. | 359/298 |
| 7,142,077 B2 * | 11/2006 | Baeck et al. | 335/78 |
| 7,256,926 B2 * | 8/2007 | Kamiya et al. | 359/290 |
| 2002/0050744 A1 * | 5/2002 | Bernstein et al. | 310/12 |
| 2003/0053186 A1 * | 3/2003 | Arima | 359/224 |
| 2003/0123128 A1 | 7/2003 | Park | |
| 2005/0122604 A1 * | 6/2005 | Kamiya et al. | 359/872 |
| 2005/0270127 A1 * | 12/2005 | Six | 335/78 |
| 2005/0275497 A1 * | 12/2005 | Ramadan et al. | 336/200 |
| 2007/0053035 A1 | 3/2007 | Cho et al. | |
| 2007/0092093 A1 * | 4/2007 | Shim | 381/189 |

FOREIGN PATENT DOCUMENTS

| | | |
|---|---|---|
| KR | 10-2003-0091479 A | 12/2003 |
| KR | 10-2006-0124079 A | 12/2006 |
| KR | 10-2007-0028919 A | 3/2007 |

* cited by examiner

TWO-AXIS DRIVING ELECTROMAGNETIC MICRO-ACTUATOR

CROSS-REFERENCE TO RELATED PATENT APPLICATION

This application claims priority from Korean Patent Application No. 10-2007-0030035, filed on Mar. 27, 2007, in the Korean Intellectual Property Office, the disclosure of which is incorporated herein in its entirety by reference.

BACKGROUND OF THE INVENTION

1. Field of the Invention

Apparatuses consistent with the present invention relate to an electromagnetic micro-actuator, and more particularly, to an electromagnetic micro-actuator having an improved driving coil that drives a stage on which a mirror face is formed.

2. Description of the Related Art

Recently, researches about electromagnetic micro-actuators manufactured using micro-machining techniques have been actively conducted in various technical fields such as displays, laser printers, precise measurement devices, and precise processing. For example, the electromagnetic micro-actuators can be used in an optical scanner for reflecting scanning light towards an image region in a screen.

The optical scanner includes a mirror surface to reflect incident light, and the mirror surface vibrates with respect to vibration axes that are different from each other to scan incident light emitted from a light source on an image region in vertical or horizontal directions. Light beams reflected by the mirror surface form a plurality of scanning lines on the image region by oscillating in a given scanning angle in the horizontal direction, and the scanning angle variations in the horizontal direction can be a sine wave that reciprocally vibrates with a high frequency. When a scanning of an image has been completed by moving a beam spot from an upper end position to a lower end position of the image, the scanning beam oscillates within a predetermined scanning angle in the vertical direction in order to relocate the beam spot to the upper end position of the image. The vertical scanning signal may be expressed as a function of a saw-tooth type wave.

An electromagnetic actuator that uses a magnetic apparatus, for example, an electromagnet or a permanent magnet, horizontally and vertically scans a mirror unit by applying a magnetic field to a driving coil that surrounds the mirror unit.

However, when a signal that is used for horizontal scanning and another signal that is used for vertical scanning are simultaneously applied to one driving coil, the horizontal scanning signal and the vertical scanning signal overlap, and thus, a maximum current increases, thereby resulting in an increase of power consumption.

However, when a horizontal scanning coil and a vertical scanning coil are formed on an inner frame that supports the mirror unit and on an external frame that supports the inner frame, respectively, the horizontal scanning coil has a reduced distance from the mirror unit, thereby reducing the rotational moment. The reduced rotational moment reduces a driving angle and may cause thermal deformation of a portion of the horizontal scanning coil by forming the high frequency horizontal scanning coil in a small area.

In order to scan an image on a screen located at the outside using an optical scanner, a scanning line can be scanned on the screen by vibrating the mirror, for example, in a saw-tooth type wave with a frequency of 60 Hz with respect to a horizontal torsion axis and in a sine wave with a relatively high frequency of approximately 20 KHz with respect to the vertical torsion axis. That is, the high frequency vibration in the vertical torsion axis horizontally scans the scanning line onto the screen, and the low frequency vibration in the horizontal torsion axis vertically scans the scanning line onto the screen, thereby realizing a two dimensional image on the screen.

In case of a resonance frequency of a mass that can vibrate with respect to the horizontal torsion axis of the mirror is designed to approximately 1 kHz, and a resonance frequency of a mass that can vibrate with respect to the vertical torsion axis is designed to approximately 20 kHz, when a 60 Hz saw-tooth type wave current and a modulated horizontal resonance frequency of 20 kHz are applied to the coil of the inner frame, a moment is generated in a direction vertical to the direction of a magnetic field applied from the outside. Such moment is used to drive the mirror by separating the moment into the horizontal torsion axis and the vertical torsion axis. Since the mirror resonates at a frequency of approximately 20 kHz with respect to the vertical torsion axis due to the synthesized moment, the mirror does not react to the 60 Hz saw-tooth type wave frequency component, however, is driven at a saw-tooth type wave frequency of 60 Hz with respect to the horizontal torsion axis.

However, the moment that acts on the horizontal torsion axis includes not only the 60 Hz saw-tooth type wave frequency component, but also includes the 20 kHz sine wave frequency component. Therefore, a minute vibration at the 20 kHz frequency occurs when the image is vertically scanned. That is, the horizontal torsion axis and the vertical torsion axis must independently vibrate by the low frequency signal (60 Hz) and the high frequency signal (20 kHz), respectively. However, the high frequency signal affects the vibration of the horizontal torsion axis that vibrates by the low frequency signal, thereby causing a minute vibration that prevents the scanning line from scanning on a desired point, and reducing resolution of an image. Hence, due to the vibration by the high frequency signal when a vertical scanning is performed, the horizontal scanning lines overlap each other. As a result, a high resolution image cannot be realized.

The vibration due to the high frequency signal is not only a problem to the scanner, but also to the entire electromagnetic actuator that requires a precise location control. In order to solve this problem, a circuitry configured with a low frequency pass filter can be employed. However, in this case, additional electronic parts are needed, and manufacturing costs increase.

SUMMARY OF THE INVENTION

To address the above and/or other aspects, the present invention provides a two-axis driving electromagnetic actuator having driving coils in which a horizontal scanning signal and a vertical scanning signal are divided.

The present invention also provides a two-axis driving electromagnetic actuator having a low frequency pass filter that reduces a high frequency signal, which is a horizontal scanning signal, from affecting a low frequency signal, which is a vertical scanning signal.

According to an aspect of the present invention, there is provided a stage that is operative to be actuated about a first axis; an inner frame that is disposed outside the stage and supports the stage by the first axis; an external frame that is disposed outside the inner frame and supports the inner frame by a second axis which is perpendicular to the first axis; a magnet that provides an electric field between the first axis and the second axis; a first driving coil that is formed on the inner frame and to which a first signal that actuates the stage in a direction of the second axis is applied; and a second driving coil that is formed on the inner frame and to which a second signal that actuates the stage and the inner frame in a direction of the first axis is applied, wherein the first driving coil and the second driving coil are electrically separated from each other.

The first driving coil and the second driving coil may be alternately formed, and may be wound for the same number of times on the inner frame.

A high frequency signal may be applied to the first driving coil and a low frequency signal may be applied to the second driving coil.

According to an other aspect of the present invention, there is provided a two-axis driving electromagnetic actuator comprising: a stage that is operative to be actuated about a first axis; a middle frame that is disposed outside the stage and supports the stage by the first axis; an inner frame that is disposed outside the middle frame and supports the middle frame by a second axis which is perpendicular to the first axis; an external frame that is disposed outside the inner frame and supports the inner frame by the second axis; a magnet that provides an electric field between the first axis and the second axis; a first driving coil that is formed on the inner frame and to which a first signal that actuates the stage in a direction of the second axis is applied; and a second driving coil that is formed on the inner frame and to which a second signal that actuates the stage and the inner frame in a direction of the first axis is applied, wherein the first driving coil and the second driving coil are electrically separated from each other.

The two-axis driving electromagnetic actuator may further comprise a third driving coil on the middle frame to which a third signal that actuates the stage in the direction of the second axis is applied; and a fourth driving coil on the middle frame to which a fourth signal that actuates the stage in the direction of the first axis direction is applied, wherein the third and fourth driving coils are electrically separated from each other.

The third driving coil and the fourth driving coil may be alternately formed, and may be wound for the same number of times on the middle frame.

A high frequency signal may be applied to the third driving coil and a low frequency signal may be applied to the fourth driving coil.

The third driving coil may be connected to the first driving coil, and the fourth driving coil may be connected to the second driving coil.

The natural frequency of the stage and the middle frame 260 may be equal to or less than $1/\sqrt{2}$ of the natural driving frequency applied to the external frame.

BRIEF DESCRIPTION OF THE DRAWINGS

The above and other aspects of the present invention will become more apparent by describing in detail exemplary embodiments thereof with reference to the attached drawings. in which.

DETAILED DESCRIPTION OF EXEMPLARY EMBODIMENTS

The present invention will now be described more fully with reference to the accompanying drawings in which exemplary embodiments of the invention are shown.

Figure 1:
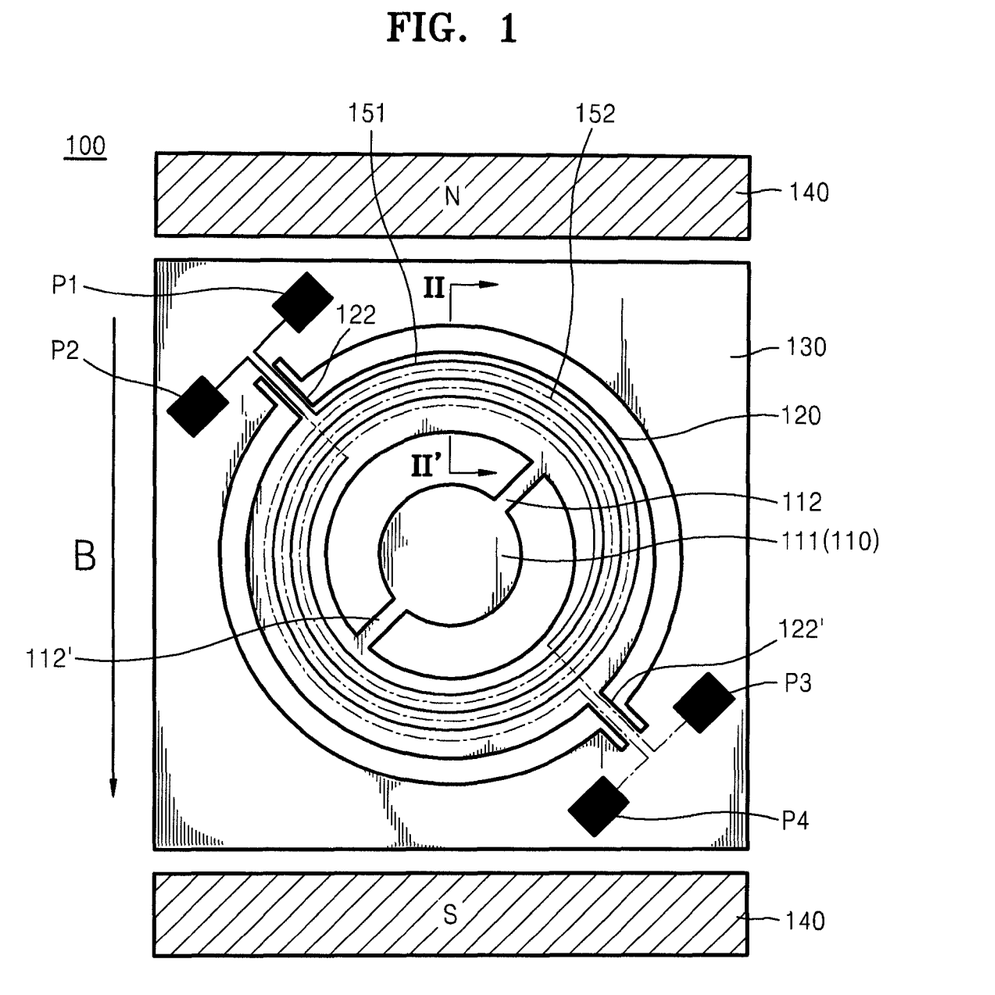
FIG. 1 is a plan view of a scanner having a two-axis driving electromagnetic actuator according to an exemplary embodiment of the present invention.

FIG. 1 is a plan view of a scanner 100 having a two-axis driving electromagnetic actuator according to an exemplary embodiment of the present invention.

Referring to FIG. 1, the scanner 100 includes a stage 110 having a mirror surface 111 thereon, an inner frame 120 that supports the stage 110, and an external frame 130 that supports the inner frame 120. A pair of permanent magnets 140 is formed on both sides of the external frame 130. However, a pair of electromagnets may also be used instead of the pair of permanent magnets 140.

First torsion springs 112 and 112' are formed in a first axis direction between the stage 110 and the inner frame 120. The stage 110 can rotate in a second axis direction perpendicular to the first axis direction about the first torsion springs 112 and 112'. The stage 110 and the first torsion springs 112 and 112' are designed to have a mass and an elastic stiffness suitable for vibrating at a high frequency signal.

Second torsion springs 122 and 122' are formed in the second axis direction between the inner frame 120 and the external frame 130. The inner frame 120 and the second torsion springs 122 and 122' are designed to have a mass and an elastic stiffness suitable for vibrating at a low frequency signal.

The pair of permanent magnets 140 is located between the first axis direction and the second axis direction to face each other, and form a magnetic field in a direction indicated by an arrow B.

Figure 2:
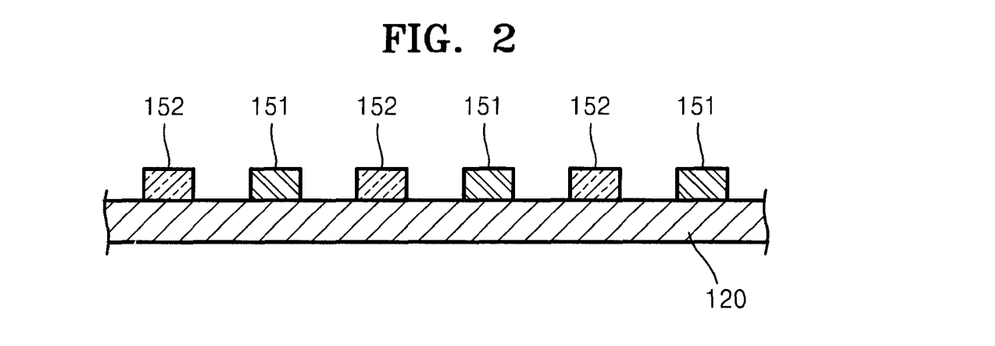
FIG. 2 is a cross-sectional view taken along line II-II of FIG. 1, according to an exemplary embodiment of the present invention.

First and second driving coils 151 and 152, which are electrically separated from each other, are formed on the inner frame 120. FIG. 2 is a cross-sectional view taken along line II-II' of FIG. 1. Referring to FIG. 2, the first driving coil 151 and the second driving coil 152 are alternately formed.

The first driving coil 151 starts from an electrode pad P1, passes through the second torsion spring 122, is wound a few to a few tens of times on the inner frame 120, and returns to an electrode pad P2 through the second torsion spring 122.

The second driving coil 152 starts from an electrode pad P3, passes through the second torsion spring 122', is wound a few to a few tens of times on the inner frame 120, and returns to an electrode pad P4 through the second torsion spring 122'.

A high frequency current of, for example, a 20 kHz current, is applied to the first driving coil 151. Thus, the stage 110 rotates in a resonant mode by the Lorentz force due to a magnetic field applied by the pair of permanent magnets 140.

A low frequency current of, for example, a 60 Hz current, is applied to the second driving coil 152. Thus, the inner frame 120 rotates in a non-resonant mode, that is, moves linearly due to the magnetic field applied by the pair of permanent magnets 140, and as a result, the stage 110 connected to the first torsion springs 112 and 112' rotates in a non-resonant mode.

The resonant movement of the stage 110 and the linear movement of the stage 110 due to the linear movement of the inner frame 120 are used for horizontal scanning and vertical scanning of a display, respectively. Accordingly, when a laser light is irradiated onto the mirror surface 111 on the stage 110, the laser light is vertically scanned while scanned horizontally onto a screen (not shown), thereby displaying a two-dimensional image.

As described above, in the present exemplary embodiment, since the first driving coil 151 and the second driving coil 152 are electrically separated from each other, a horizontal scanning signal and a vertical scanning signal are applied to the first driving coil 151 and the second driving coil 152, respectively. Since the first driving coil 151 and the second driving coil 152 are alternately formed on the inner frame 120, an arm of a moment applied to the stage 110 is increased. Thus, a driving angle of the stage 110 for horizontal scanning can be increased. As a result, a maximum current that is applied to the first driving coil 151 is reduced. Since the maximum current is reduced, the areas of the first and second driving coils 151 and 152 can be reduced. Thus, the number of windings of the first and second driving coils 151 and 152 in the same area can be increased.

Since the first and second driving coils 151 and 152 are not formed on the stage 110 where the mirror surface 111 is formed, the stage 110, which has a small mass, can be prevented from being thermally deformed. Otherwise, the stage 110 may be thermally deformed if the first and second driving coils are formed on the stage 110.

Figure 3:
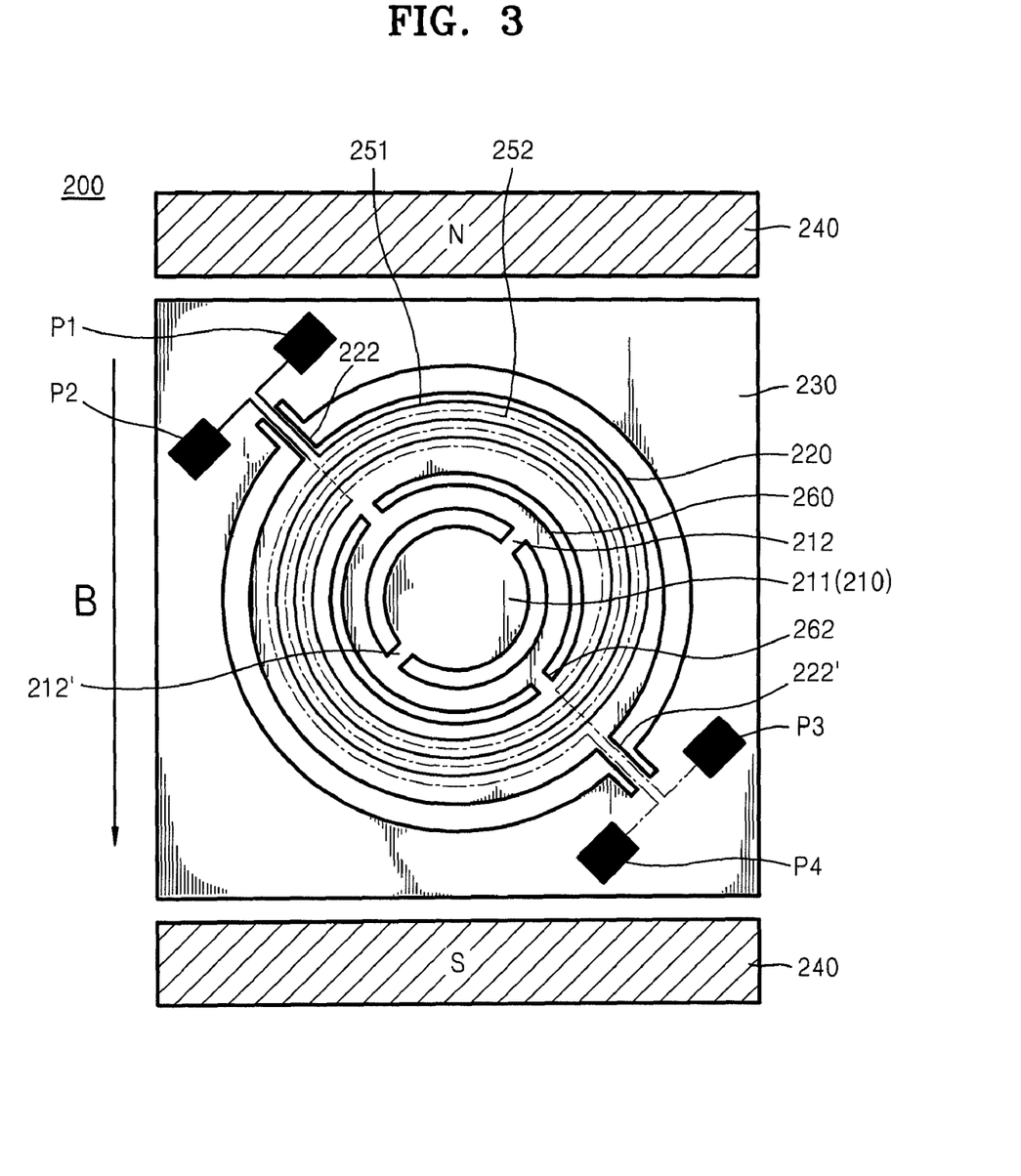
FIG. 3 is a plan view of a scanner having a two-axis driving electromagnetic actuator according to another exemplary embodiment of the present invention.

FIG. 3 is a plan view of a scanner 200 having a two-axis driving electromagnetic actuator according to another exemplary embodiment of the present invention.

Referring to FIG. 3, the scanner 200 includes a stage 210 having a mirror surface 211 thereon, an inner frame 220 that supports the stage 210, an external frame 230 that supports the inner frame 220, and a middle frame 260 located between the inner frame 220 and the stage 210. A pair of permanent magnets 240 is disposed on both sides of the external frame 230.

First torsion springs 212 and 212' are formed in a first axis direction between the stage 210 and the middle frame 260. The stage 210 can be actuated in a second axis direction perpendicular to the first axis direction about the first torsion springs 212 and 212'. The stage 210 and the first torsion springs 212 and 212' are designed to have a mass and an elastic stiffness suitable for vibrating at a high frequency.

Third torsion springs 262 and 262' are formed in the second axis direction between the middle frame 260 and the inner frame 220.

Second torsion springs 222 and 222' are formed in the second axis direction between the inner frame 220 and the external frame 230. The inner frame 220 and the second torsion springs 222 and 222' are formed to have a mass and an elastic stiffness suitable for vibrating at a low frequency. The second torsion springs 222 and 222' and the third torsion springs 262, 262' may be located on the same axis.

The pair of permanent magnets 240 is disposed to face each other between the first axis direction and the second axis direction, and form a magnetic field in a direction indicated by an arrow B.

First and second driving coils 251 and 252, which are electrically separated from each other, are formed on the inner frame 220. The first and second driving coils 251 and 252 are alternately formed on the inner frame 220.

The first driving coil 251 starts from an electrode pad P1, passes through the second torsion spring 222, is wound a few to a few tens of times on the inner frame 220, and returns to an electrode pad P2 through the second torsion spring 222.

The second driving coil 252 starts from an electrode pad P3, passes through the second torsion spring 222', is wound a few to a few tens of times on the inner frame 220, and returns to an electrode pad P4 through the second torsion spring 222'.

A high frequency current of, for example, a 20 kHz current, is applied to the first driving coil 251. Thus, the stage 210 rotates in a resonant mode by the Lorentz force due to a magnetic field applied by the permanent magnets 240.

A low frequency current of, for example, a 60 Hz current, is applied to the second driving coil 252. Thus, the inner frame 220 rotates in a non-resonant mode, that is, a linear mode due to the magnetic field applied by the permanent magnets 240. As a result, the middle frame 260, which is connected to the inner frame 220 by the third torsion springs 262 and 262', and the stage 210, which is connected to the first torsion springs 212 and 212', rotate in a non-resonant mode.

The resonant movement of the stage 210 and the linear movement of the stage 210 due to the linear movement of the inner frame 220 are used for horizontal scanning and vertical scanning of a display, respectively. Accordingly, when a laser light is irradiated onto the mirror surface 211 on the stage 210, the laser light is vertically scanned while scanned horizontally onto a screen (not shown), thereby displaying a two-dimensional image.

As described above, in the present exemplary embodiment, since the first driving coil 251 and the second driving coil 252 are electrically separated from each other, a horizontal scanning signal and a vertical scanning signal are applied to the first driving coil 251 and the second driving coil 252, respectively. Since the first driving coil 251 and the second driving coil 252 are alternately formed in the inner frame 220, an arm of a moment to be applied to the stage 110 is increased, and a driving angle of the stage 210, for horizontal scanning, can be increased. As a result, a maximum current that is applied to the first driving coil 251 is reduced. Since the maximum current is reduced, areas of the first and second driving coils 251 and 252 can be reduced. Thus, the number of windings of the first and second driving coils 251 and 252 in the same area can be increased.

Since the first and second driving coils 251 and 252 are not formed on the stage 210 where the mirror surface 211 is formed, the stage 210, which has a small mass, can be prevented from being thermally deformed. Otherwise, the stage 210 may be thermally deformed if the first and second driving coils are formed on the stage 210.

Figure 4:
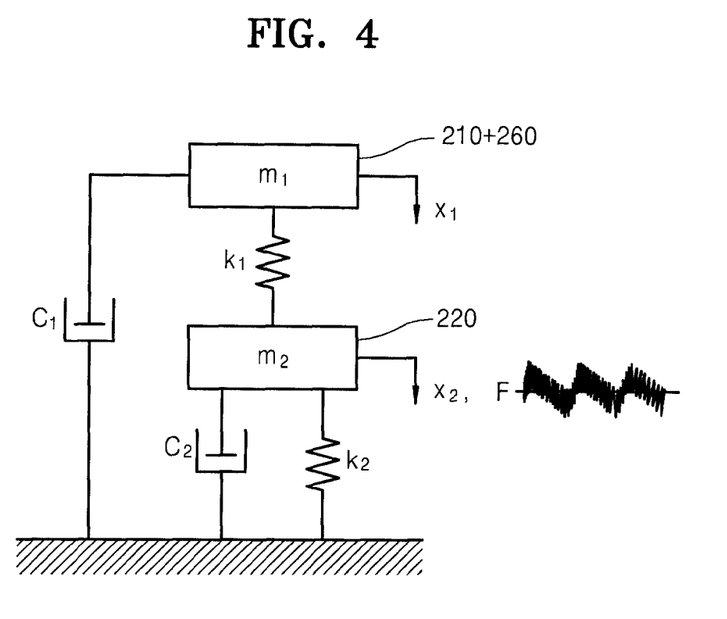
FIG. 4 is a drawing for explaining an operation of a middle frame as a mechanical low frequency pass filter, according to an exemplary embodiment of the present invention.

FIG. 4 is a drawing for explaining an operation of the middle frame 260, which is a mechanical low frequency pass filter, according to an exemplary embodiment of the present invention. For this purpose, the scanner 200 having the configuration as illustrated in FIG. 3 is modelled, and like reference numerals are used to indicate elements that are substantially identical to the elements of FIG. 3, and thus, a detailed description thereof will not be repeated.

Referring to FIG. 4, it is assumed that the combined mass of the middle frame 260 and the stage 210 is $m_1$, the actuation stiffness of the third torsion springs 262 and 262' is $k_1$, the damping constant is $c_1$, the mass of the inner frame 220 is $m_2$, the actuation stiffness of the second torsion springs 222 and 222' is $k_2$, and the damping constant is $c_2$. In this case, the scanner 200 can be modelled in a following equation 1.

$$m_1 \cdot d^2x_1 dt^2 + c_1 \cdot dx_1 dt + (x_1 - x_2)k_1 = 0 \quad \text{[Equation 1]}$$
$$m_2 \cdot d^2x_2 dt^2 + c_2 \cdot dx_2 dt + (k_1 + k_2)x_2 - k_1 x_1 = F$$

Figure 5:
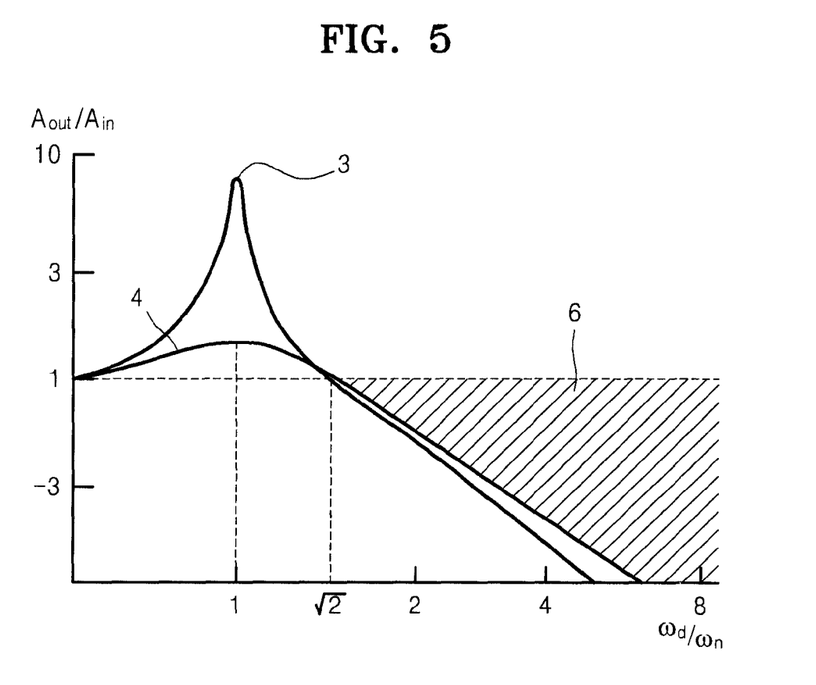
FIG. 5 is a graph showing transmissibility according to a frequency ratio, according to an exemplary embodiment of the present invention.

In order to observe the movement of the stage 210 and the middle frame 260, it is assumed that $\omega_n$ is the natural frequency of the stage 210 and the middle frame 260 when the stage 210 and the middle frame 260 vibrate about the third torsion springs 262 and 262'. In a secondary system such as the scanner 200, a vibration of the mass $m_2$ due to a force F is divided into a saw-tooth type low frequency component and a sine wave type high frequency component. A vibration amount $x_1$ of the mass $m_1$ is determined by a vibration amount $x_2$ and frequency of the mass $m_2$. In general, when a vibration having a magnitude of $A_{in}$ and a driving frequency of $\omega_d$ is applied to a supporter (the external frame 230), the response characteristics of a spring-mass-damper system connected to the supporter is known as shown in FIG. 5, and a frequency ratio and transmissibility are defined by following equations 2 and 3.

$$\text{Frequency ratio} = \omega_d/\omega_n \quad \text{[Equation 2]}$$

$$\text{Transmissibility} = A_{out}/A_{in}, \quad \text{[Equation 3]}$$

where $A_{out}$ indicates an amplitude of the vibration of the mass $m_1$ due to the vibration of the supporter.

In FIG. 5, an x-axis represents the frequency ratio, and y-axis represents the transmissibility. Referring to FIG. 5, if an external input that generates a vibration identical to the natural frequency of the mass $m_1$ is applied to the supporter (point 1 on the x-axis), the largest amplitude occurs, and when a vibration having a much lower frequency than the natural frequency of the mass $m_1$ is inputted to the supporter, the transmissibility approaches 1. If the frequency ratio is greater than $\sqrt{2}$, the transmissibility enters a buffer region 6 where the transmissibility is less than 1. Curve 3 is a characteristic curve of a material having a low attenuation value, such as rubber or silicon. Curve 4 is a characteristic curve of a material having a high attenuation value. If the frequency ratio is greater than $\sqrt{2}$, regardless of the attenuation value, the transmissibility falls into the buffer region 6. The buffer region 6 can be a region where the high frequency component is filtered. In other words, in order to be desensitized to a high frequency vibration applied from the outside, the natural frequency of the stage 210 and the middle frame 260 must be designed to $1/\sqrt{2}$ or less of a high frequency vibration applied from the outside.

Figure 6A:
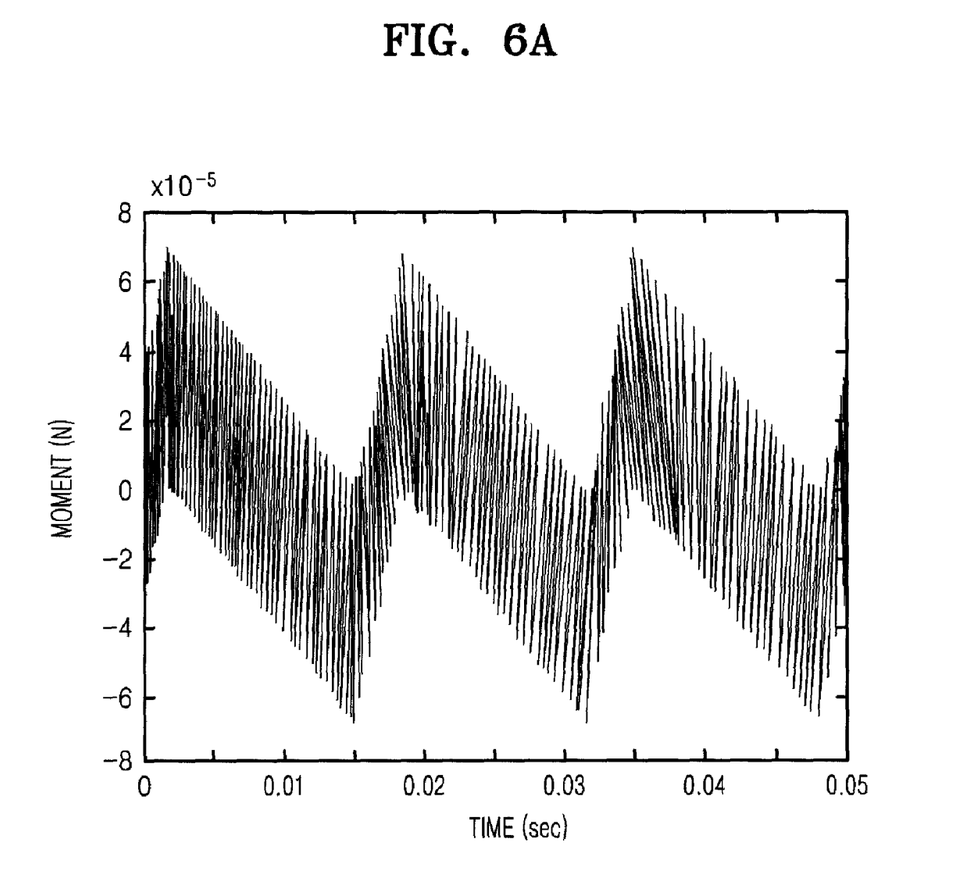
FIG. 6A is a graph showing a synthesized moment according to time, according to an exemplary embodiment of the present invention.
Figure 6B:
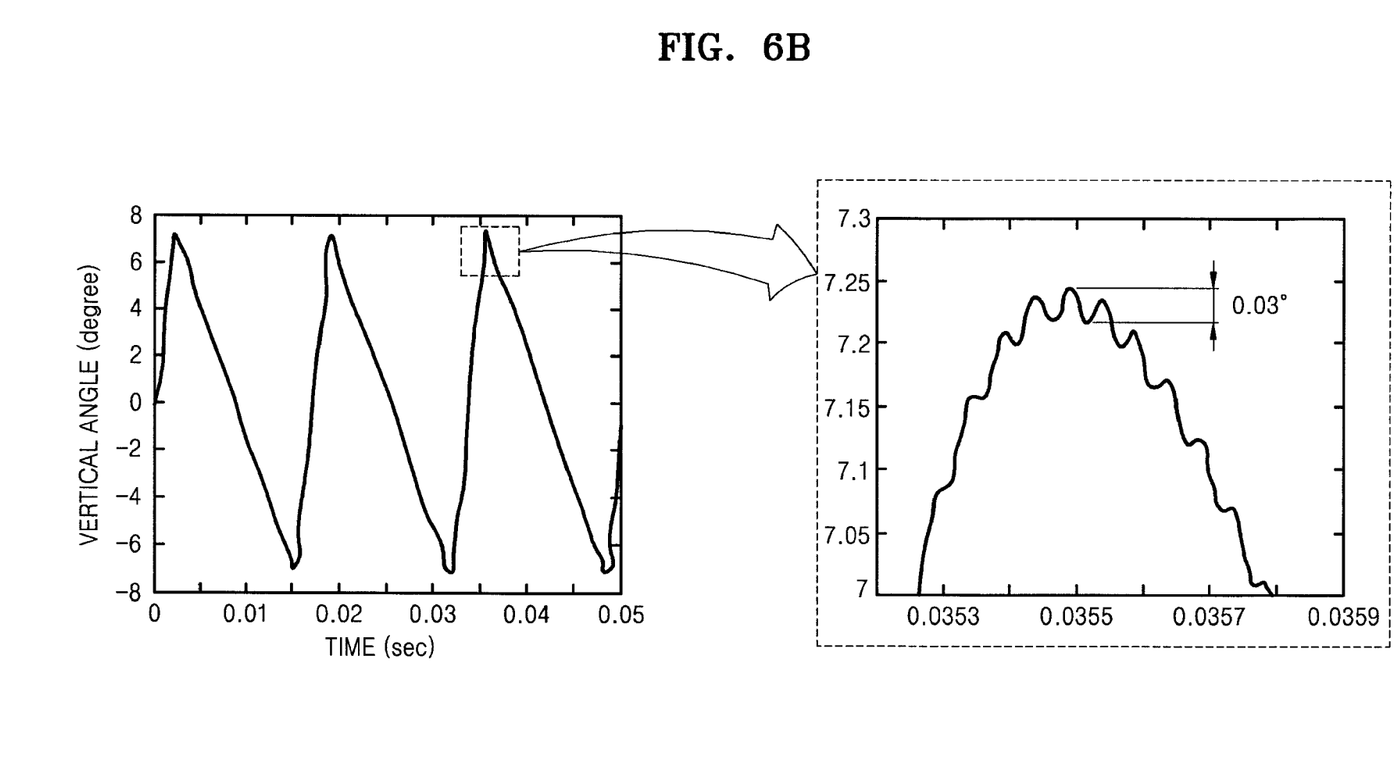
FIGS. 6B and 6C respectively are graphs showing the displacement of x2 and x1 of an inner frame with respect to time, according to exemplary embodiments of the present invention.
Figure 6C:
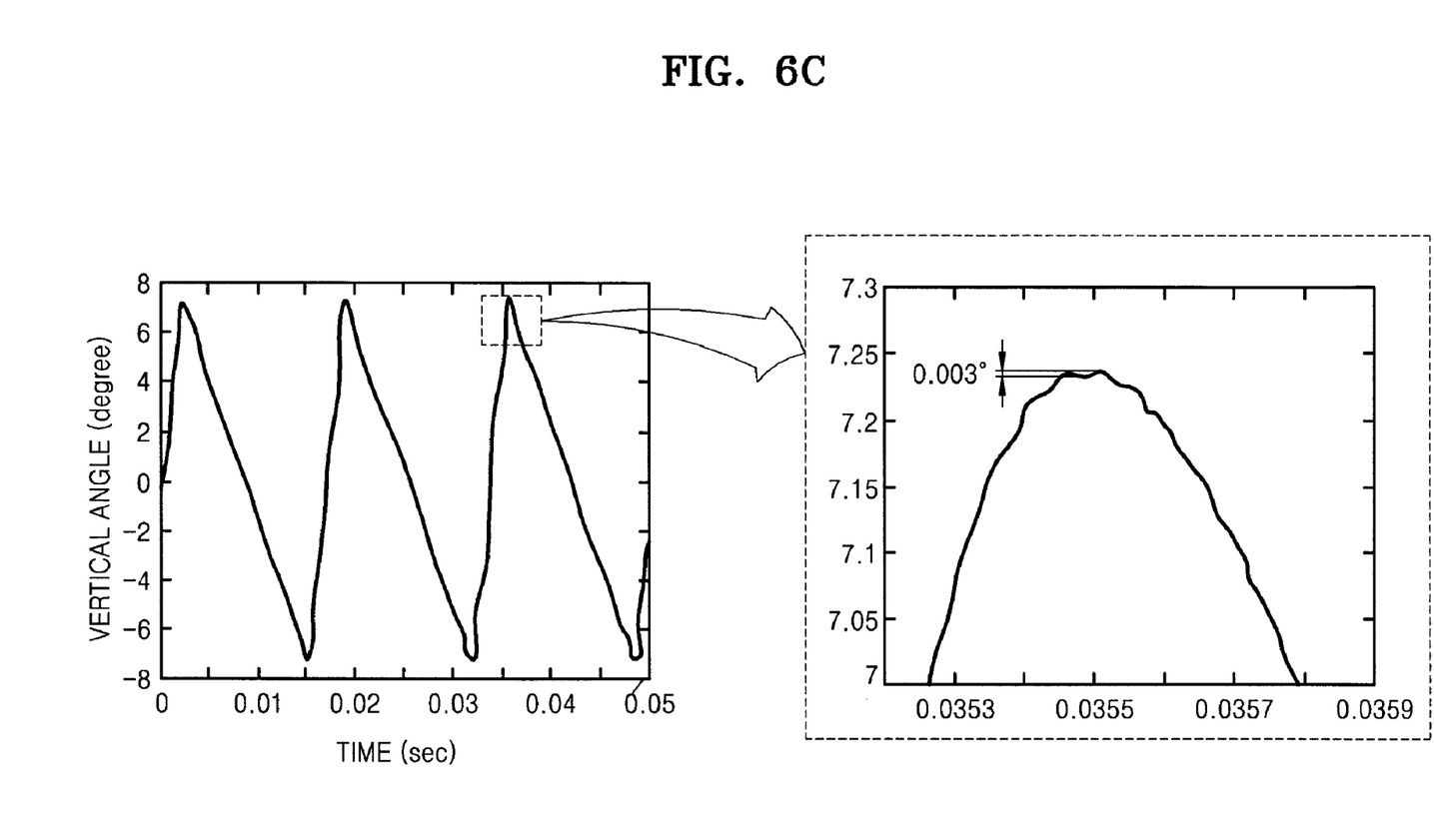

An operation of a mechanical low frequency pass filter according to an exemplary embodiment of the present invention will now be described with reference to FIG. 3. FIG. 6A is a graph showing a synthesized moment with respect to time, according to an exemplary embodiment of the present invention. FIGS. 6B and 6C are graphs showing the displacement of the vibration amount $x_2$ and $x_1$ of the inner frame 220 with respect to time, respectively, according to exemplary embodiments of the present invention.

When a current is applied to the first and second driving coils 251 and 252, a high frequency moment due to the first driving coil 251 and a low frequency moment due to the second driving coil 252 are generated in the inner frame 220. A synthesized moment, when a vertical driving signal of the low frequency moment is approximately 60 Hz and a horizontal driving signal of the high frequency moment is approximately 20 kHz, is depicted in FIG. 6A.

The inner frame 220 that vibrates about the second torsion spring 222 and 222' is designed to have a resonant frequency of approximately 1 kHz, and the stage 210 that vibrates about the first torsion spring 212 is designed to have a resonant frequency of approximately 20 kHz. A horizontal scanning component and a vertical scanning component of the synthesized moment vibrate the inner frame 220 in the first axis direction and the second axis direction, respectively. The vibration of the inner frame 220 that vibrates about the first torsion spring 212 includes a 60 Hz component and a 20 kHz component, and thus, transmissibility is very large since the vibration is coincident with the 20 kHz resonant frequency of the stage 210. Therefore, the stage 210 shows a large displacement about the first torsion spring 212 due to resonation of the stage 210, and vibrates as a sine wave.

The vibration of the inner frame 220 that vibrates about the second torsion spring 222 and 222' also includes a 60 Hz component and a 20 kHz component. In this case, when the resonant frequency of the inner frame 220 is designed to have a component of, for example, 1 kHz, the 20 kHz component is weakly present and the vibration component of a 60 Hz saw-tooth type wave mainly appears.

At this point, as depicted in FIG. 6B, the displacement $x_2$ of the inner frame 220 shows a saw-tooth type wave, however, a minute high frequency vibration occurs due to the high frequency moment. However, if the middle frame 260 and the stage 210 that vibrate about the third torsion springs 262 and 262' are designed to have a the resonant frequency of $1/\sqrt{2}$ of 20 kHz or less, for example, 8 kHz, as depicted in FIG. 6C, the simulation shows that the displacement $x_1$ of the middle frame 260 and the stage 210 is greatly reduced to, for example, approximately 1/10 since most of the high frequency components are filtered. This is because the vibration component of 20 kHz of the inner frame 220 is not transmitted to the middle frame 260 and the stage 210 that have the resonant frequency of 8 kHz. Hence, since the mechanical structure of the middle frame 260 and the third torsion springs 262 and 262' functions as a low frequency pass filter, the vibration of the stage 210 about the second torsion spring 222 and 222' can be prevented. Accordingly, a vertical separation distance between the horizontal scanning lines is uniform, and thus, the horizontal scanning lines are not overlapped, thereby increasing the resolution of an image.

Figure 7:
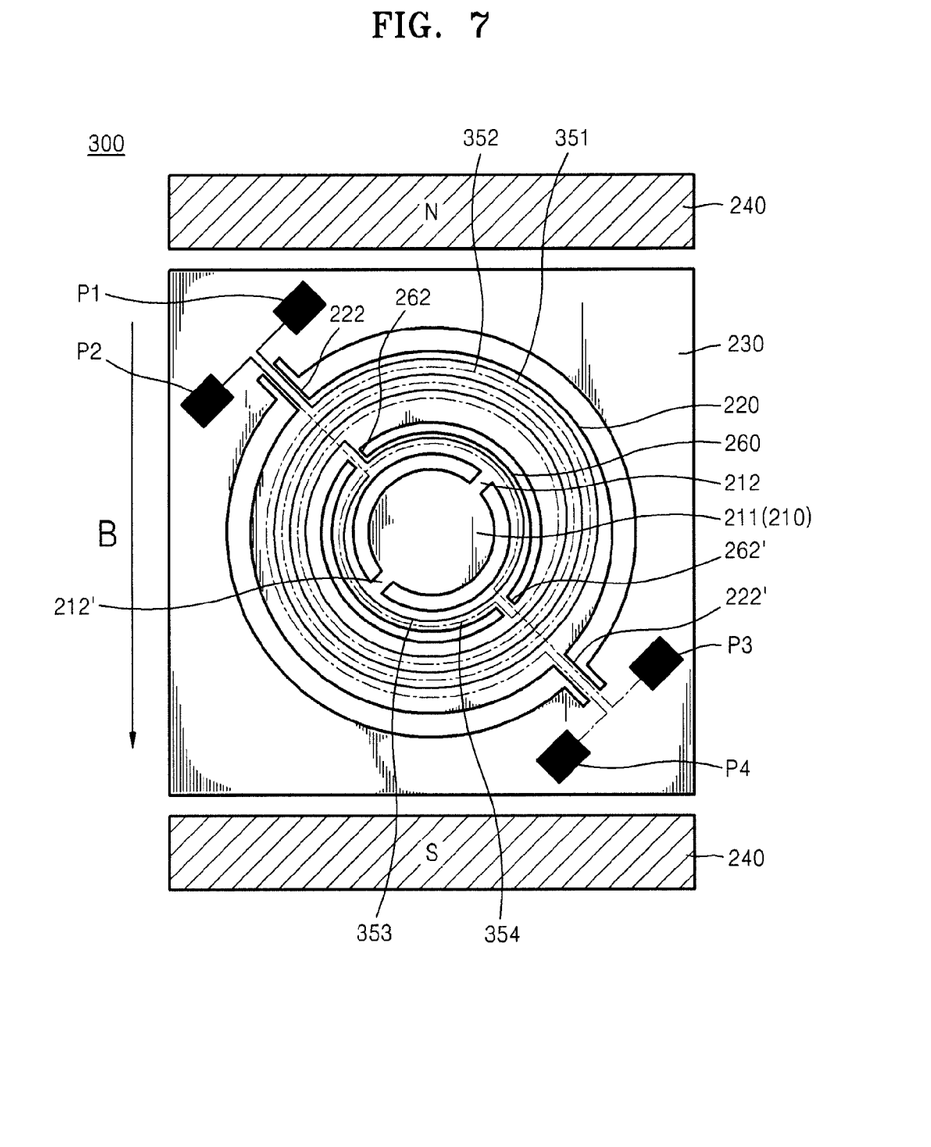
FIG. 7 is a plan view of a scanner having a two-axis driving electromagnetic actuator according to still another exemplary embodiment of the present invention.

FIG. 7 is a plan view of a scanner 300 including a two-axis driving electromagnetic actuator according to another exemplary embodiment of the present invention. Like reference numerals are used to indicate elements that are substantially identical to the elements of the scanner 200 of FIG. 3, and thus, a detailed description thereof will not be repeated.

Referring to FIG. 7, a first driving coil 351 and a second driving coil 352 that drive the scanner 300 extend on the middle frame 260. The first driving coil 351 and the second driving coil 352 are electrically separated from each other on the middle frame 260, and are alternately formed on the inner frame 220 and the middle frame 260.

The first driving coil 351 starts from the electrode pad P1, passes through the second torsion spring 222, is wound a few to a few tens of times on the inner frame 220, passes the third torsion spring 262, is wound a few times on the middle frame 260, and returns to the electrode pad P2 through the third torsion spring 262, the inner frame 220, and the second torsion spring 222. The first driving coil 351 forms a third driving coil 353 on the middle frame.

The second driving coil 352 starts from the electrode pad P3, passes through the second torsion spring 222', is wound a few to a few tens of times on the inner frame 220, passes the third torsion spring 262', is wound a few times on the middle frame 260, and returns to the electrode pad P4 through the third torsion springs 262', the inner frame 220, and the second torsion spring 222'. The second driving coil forms a fourth driving coil 354 on the middle frame.

A high frequency current of, for example, a 20 kHz current, is applied to the first driving coil 351. Thus, the stage 210 rotates in a resonant mode by the Lorentz force due to a magnetic field applied by the pair of permanent magnets 240.

A low frequency current of, for example, a 60 Hz current, is applied to the second driving coil 352. Thus, the inner frame 220 rotates in a non-resonant mode, that is, a linear mode due to a magnetic field applied by the pair of permanent magnets 240. As a result, the middle frame 260, which is connected to the inner frame 220 by the third torsion springs 262 and 262', and the stage 210, which is connected to the first torsion springs 212 and 212', rotates in a non-resonant mode.

A driving force can be increased since the first and second driving coils 351 and 352 can be wound on the middle frame 260.

According to the exemplary embodiments of the present invention, since a vertical scanning driving coil and a horizontal scanning driving coil are formed alternatively, the lengths of the horizontal and vertical scanning driving coils can be reduced, thereby reducing a resistance in the horizontal and vertical scanning driving coils, thereby reducing power consumption of the two-axis driving electromagnetic actuator.

Since separate signals are applied to the horizontal scanning driving coil and the vertical scanning driving coil of the two-axis driving electromagnetic actuator, the maximum current in the horizontal and vertical scanning driving coils can be reduced, thereby reducing power consumption of the two-axis driving electromagnetic actuator. The reduction of the maximum current in the horizontal and vertical scanning driving coils can reduce an area of the horizontal and vertical scanning driving coils, and thus, the number of windings of each of the horizontal and vertical scanning driving coils per unit area can be increased, thereby increasing a driving force of the two-axis driving electromagnetic actuator.

Also, a two-axis driving electromagnetic actuator according to the exemplary embodiments of the present invention provides a mechanical structure having a mechanical low frequency pass filter that removes a particular high frequency component from an inputted external vibration to the two-axis driving electromagnetic actuator. Also, the mechanical structure of the mechanical low frequency pass filter does not need an extra device to control by a simple mechanical design modification of the two-axis driving electromagnetic actuator.

In the two-axis driving electromagnetic actuator according to the exemplary embodiments of the present invention, interference by high frequency is effectively removed. Thus, a vibration due to the high frequency can be removed, and a precise position control is possible. When the two-axis driving electromagnetic actuator is applied to a scanner, a vertical separation distance can be maintained constant. As a result, the overlapping of scanning lines can be prevented, thereby increasing the resolution of an image.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A two-axis driving electromagnetic actuator comprising:
    a stage that is operative to be actuated about a first axis;
    a middle frame that is disposed outside the stage and supports the stage by the first axis;
    an inner frame that is disposed outside the middle frame and supports the middle frame by a second axis which is perpendicular to the first axis;
    an external frame that is disposed outside the inner frame and supports the inner frame by the second axis;
    a magnet that provides a magnetic field between the first axis and the second axis;
    a first driving coil that is formed on the inner frame and to which a first signal that actuates the stage in a direction of the second axis is applied; and
    a second driving coil that is formed on the inner frame and to which a second signal that actuates the stage and the inner frame in a direction of the first axis is applied,
    wherein the first driving coil and the second driving coil are electrically separated from each other,
    wherein the first driving coil and the second driving coil are disposed away from the stage.

2. The two-axis driving electromagnetic actuator of claim 1, wherein the first driving coil and the second driving coil are alternately formed.

3. The two-axis driving electromagnetic actuator of claim 1, wherein the first driving coil and the second driving coil are each wound on the inner frame an identical number of times.

4. The two-axis driving electromagnetic actuator of claim 1, wherein a high frequency signal is applied to the first driving coil and a low frequency signal is applied to the second driving coil.

5. The two-axis driving electromagnetic actuator of claim 1,
    wherein the first signal comprises a high frequency current and the actuation of the stage by the first signal comprises rotation in a resonant mode, and
    wherein the second signal comprises a low frequency signal and the actuation of the stage comprises rotation in a non-resonant mode.

6. The two-axis driving electromagnetic actuator of claim 1,
    wherein the first axis comprises two oppositely disposed first torsion springs which connect the stage to the middle frame, and
    wherein the second axis comprises two oppositely disposed second torsion springs, which connect the inner frame to the external frame, and two oppositely disposed third torsion springs which connect the middle frame to the inner frame.

7. The two-axis driving electromagnetic actuator of claim 1, further comprising:
    a third driving coil on the middle frame to which a third signal that actuates the stage in the direction of the second axis is applied; and
    a fourth driving coil on the middle frame to which a fourth signal that actuates the stage in the direction of the first axis direction is applied,
    wherein the third and fourth driving coils are electrically separated from each other.

8. The two-axis driving electromagnetic actuator of claim 7, wherein the third driving coil and the fourth driving coil are alternately formed.

9. The two-axis driving electromagnetic actuator of claim 7, wherein the third driving coil and the fourth driving coil are wound for a same number of times on the middle frame.

10. The two-axis driving electromagnetic actuator of claim 7, wherein a high frequency signal is applied to the third driving coil and a low frequency signal is applied to the fourth driving coil.

11. The two-axis driving electromagnetic actuator of claim 7, wherein the third driving coil is connected to the first driving coil, and the fourth driving coil is connected to the second driving coil.

12. The two-axis driving electromagnetic actuator of claim 7, wherein a natural frequency of the stage and the middle frame is equal to or less than $1/\sqrt{2}$ of a driving frequency applied to the external frame.

13. The two-axis driving electromagnetic actuator of claim 7, further comprising a mirror surface on the stage that scans light.

* * * * *